US007085627B2

(12) United States Patent
Bamberger et al.

(10) Patent No.: US 7,085,627 B2
(45) Date of Patent: Aug. 1, 2006

(54) INTEGRATED SYSTEM FOR CONTROLLING LIGHTS AND SHADES

(75) Inventors: Matthew Bamberger, Coopersburg, PA (US); Lawrence R. Carmen, Jr., Bath, PA (US); Brian Courtney, Germansville, PA (US); Jason C. Killo, Emmaus, PA (US); Justin J. Mierta, Emmaus, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 7 days.

(21) Appl. No.: 10/734,378

(22) Filed: Dec. 12, 2003

(65) Prior Publication Data

US 2005/0131554 A1 Jun. 16, 2005

(51) Int. Cl.
*G05D 3/00* (2006.01)
*E06B 9/32* (2006.01)

(52) U.S. Cl. ............... 700/277; 700/275; 160/176.1 P
(58) Field of Classification Search ........ 700/275–278; 315/312; 165/209; 160/120, 176.1 P
See application file for complete search history.

(56) References Cited

U.S. PATENT DOCUMENTS

| | | | | |
|---|---|---|---|---|
| 4,308,911 A * | 1/1982 | Mandl | ............... | 165/209 |
| 5,191,265 A * | 3/1993 | D'Aleo et al. | ............... | 315/295 |
| 5,463,286 A | 10/1995 | D'Aleo et al. | ............... | 315/295 |
| 5,598,000 A | 1/1997 | Popat | ............... | 250/206 |
| 5,675,487 A * | 10/1997 | Patterson et al. | ............... | 700/56 |
| 6,100,659 A | 8/2000 | Will et al. | ............... | 318/466 |
| 6,307,331 B1 * | 10/2001 | Bonasia et al. | ............... | 315/294 |
| 6,497,267 B1 | 12/2002 | Azar et al. | ............... | 160/310 |
| 2002/0055977 A1 | 5/2002 | Nishi | ............... | 709/208 |
| 2003/0015301 A1 | 1/2003 | Killo et al. | ............... | 160/310 |
| 2003/0015302 A1 | 1/2003 | Pessina et al. | ............... | 160/331 |
| 2005/0046360 A1 * | 3/2005 | Courtney et al. | ............... | 315/318 |

FOREIGN PATENT DOCUMENTS

JP 6-111942 * 6/1994

OTHER PUBLICATIONS

Lee, E.S., et al.: "Integrated Performance of an Automated Venetian Blind/Electric Lighting System in a Full-Scale Private Office." Proceedings of the Ashrae/DOE/BTECC Conference, Sep. 1998, pp. 1-26.

(Continued)

*Primary Examiner*—Jayprakash N. Gandhi
(74) *Attorney, Agent, or Firm*—Drinker Biddle & Reath LLP

(57) ABSTRACT

A control system includes a processor transmitting signals to a shade network and a lighting system directing that motorized shades and dimmable loads be set to desired intensity levels. A communication interface having a buffer is connected between the processor and the shade network. The communication interface provides for communication with the processor based on streaming protocol and with the shade network based on event-based protocol. The shade network converts intensity levels into shade positions. The processor may direct the shade network to move a shade in a series of substantially equal steps to simulate a relatively slowly moving shade. The processor may be connected to a timing device for creating a program based on time-based shade position information for directing the shades to be moved to given positions at certain times of day. A computer running user interface software may be be connected to the system to facilitate programming.

29 Claims, 9 Drawing Sheets

OTHER PUBLICATIONS

Lee, E.S., et al.: "Low-Cost Networking for Dynamic Window Systems." High Performance Commercial Building Systems, Aug. 2003, pp. 1-14.

Rubinstein, F., et al.: "Standardizing communication between lighting control devices: a role for IEEE P1451." Conference Record of the 2003 IEEE Industry Applications Conference. 38th IAS Annual Meeting. Salt Lake City, UT, Oct. 12-16, 2003, Conference Record of the IEEE Industry Applications Conference. IAS Annual Meting, New York, NY: IEEE, US, vol. 3 of 3, Conf. 38.

Design and Layout Guide for "HomeWorks™ Integrated Lighting Control System", Lutron Electronics Co., Inc. of Coopersburg, PA, International Edition 1997, 32 pages.

Overview Brochure for "Homeworks® 8 Series", Lutron Electronics Co., Inc. of Coopersburg, PA, printed Jul. 2003, 12 pages.

Technical Reference Guide for "Homeworks®", Revision F, Lutron Electronics Co., Inc. of Coopersburg, PA, printed Jun. 2003, 176 pages.

Installation Instructions for "Homeworks Interactive™ to Sivoia® Keypad", Lutron Electronics Co., Inc. of Coopersburg, PA, printed Aug. 2002, 4 pages.

Installation Instructions for "Homeworks Sivoia® Keypad", Lutron Electronics Co., Inc. of Coopersburg, PA, printed Oct. 2003, 8 pages.

* cited by examiner

INTEGRATED SYSTEM FOR CONTROLLING LIGHTS AND SHADES

FIELD OF THE INVENTION

The present invention relates to systems for controlling motorized shade of a shade network. More particularly, the present invention relates to an integrated system for controlling both a lighting system and a network of motorized shades.

BACKGROUND OF THE INVENTION

Motorized roller shades include a flexible shade fabric that is windingly received onto a rotatably supported roller tube. The motorized roller shade also includes a motor drive unit drivingly engaging the roller tube to rotate the tube. It is known to arrange a plurality of motorized shades to provide for communication between the shades as part of a shade network. The communication between the motorized shades provided by a network arrangement facilitates centralized control of a plurality of roller shades included in the network from a convenient centralized location.

A known shade control system includes motorized shades having electronic drive units (EDUs) and wall-mountable controllers connected to the shade network for control of the network from a convenient location. The shade control system includes microprocessors at each of the motorized shades and wall-mountable controllers connected to the network for transmitting control signals and for storage of a database including network-related information.

The known shade control system is programmable such that preset shade positions for the motorized shades may be stored in the system for subsequent selection by a user by actuation of a preset actuator provided by the wall-mountable controller. The shade control system is also programmed to address each device connected to the network with a unique identifier to provide for network communication between the devices and to provide for centralized control of the motorized shades. The shade control system is also programmed to assign the EDU of each of the motorized shades of the system to one of the wall-mountable controllers for control of the EDU from the wall-mountable controller.

It is known to provide a lighting system including multiple dimmable lighting loads controlled from a central location. An example of such a lighting control system is HomeWorks® by Lutron Electronics Co., Inc. of Coopersburg, Pa. The lighting control system includes a central processor connected to dimmable loads and wall-mountable controllers for controlling the dimmable loads. The central processor transmits command signals directing that the dimmable loads be set to particular intensity levels that may range from between 0 and 100 percent.

It would be desirable to provide for integrated control of both the motorized shades of a shade network and the dimmable loads of a lighting system by a single control system. Differences between the construction and operation of known lighting and shade control systems, however, has rendered connection of a shade system to a known lighting system impractical. The central processor of the above-discussed lighting system, for example, controls the dimmable loads by transmitting commands directing that the dimmable loads be set to "intensity levels." While this is appropriate to control of dimmable loads, the concept of "intensity level" loses relevance in the context of controlling motorized shades that are directed by a shade network to place a shade in a particular shade position.

Additional difficulties in connecting a shade network to a lighting control system are presented by differences in communication protocols appropriate or desired for the respective systems. In a lighting control system, for example, it may be desirable to provide for communication using a streaming protocol system, in which packets of information are periodically transmitted. In contrast, known shade control systems use an event-based communication protocol, in which information is transmitted in response to some event, such as a button press at a controller, for example. Shade systems are not typically expected to be complicated to install, unlike prior art lighting control systems that often include a central processor. Thus, an event-based protocol is better suited for a decentralized shade system because it allows for operation at a lower baud rate.

SUMMARY OF THE INVENTION

According to one aspect of the invention, there is provided a control system including at least one shade control network having at least one motorized shade. The control system also includes a central processor adapted to transmit control signals and database information to the motorized shades of each shade control network and to receive feedback information therefrom.

The control system further includes a communication interface connected between the central processor and each shade control network to facilitate transmission of signals and database information therebetween. The communication interface device includes an information buffer for holding the feedback information from the associated shade control network for independent retrieval by the central processor. Preferably, the central processor is also connected to another control network that does not include a motorized shade, such as a lighting control system. The communication interface is preferably adapted to communicate with the central processor based on a streaming protocol and to communicate with the shade control network to which it is connected.

According to another aspect of the invention, there is provided a method of controlling lights and shades. A central processor adapted to set a device to a desired intensity level is connected to a lighting system including at least one dimmable load and to a shade control system including at least one motorized shade. Control signals are transmitted from the central processor to the lighting system and to the shade control system directing the system to respectively set the dimmable loads and the motorized shades to a desired intensity level. The shade control system is adapted to convert the desired intensity level to a shade position.

According to a preferred method of control, the central processor transmits a sequence of control signals to the shade control system such a motorized shade is moved in a series of substantially equally timed steps to simulate a relatively slowly moving shade compared to a normal rate of driven movement for the motorized shade. According to another preferred method of control, the central processor is connected to a timing device for associating shade position for the motorized shade to the time of day. The time-based information regarding shade position is stored in transmitted to the central processor for creating a macro program that, when executed, will direct the motorized shades to move to given positions at certain times of day based on the time-based information transmitted to the central processor. According to another preferred method of control, the motorized shades are toggled between first and second preset shade positions, the first preset shade position preferably being set by default by the central processor to either a fully-opened or a fully-closed position.

According to another aspect of the invention, a computer is connected to the control system. Preferably, the computer is running user interface software to facilitate programming of the control system. According to a preferred method of programming the control system, at least a portion of a database of information regarding a shade control system is transmitted to the shade control system from the computer and stored in memory. According to one preferred method, the database of information includes a serial number for each of the motorized shades of a shade control system that is input into the computer. According to another preferred method the serial numbers for the motorized shades are stored in a memory external to the computer and then imported from the external memory to the computer.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown. In the drawings.

DETAILED DESCRIPTION OF THE DRAWINGS

Figure 1:
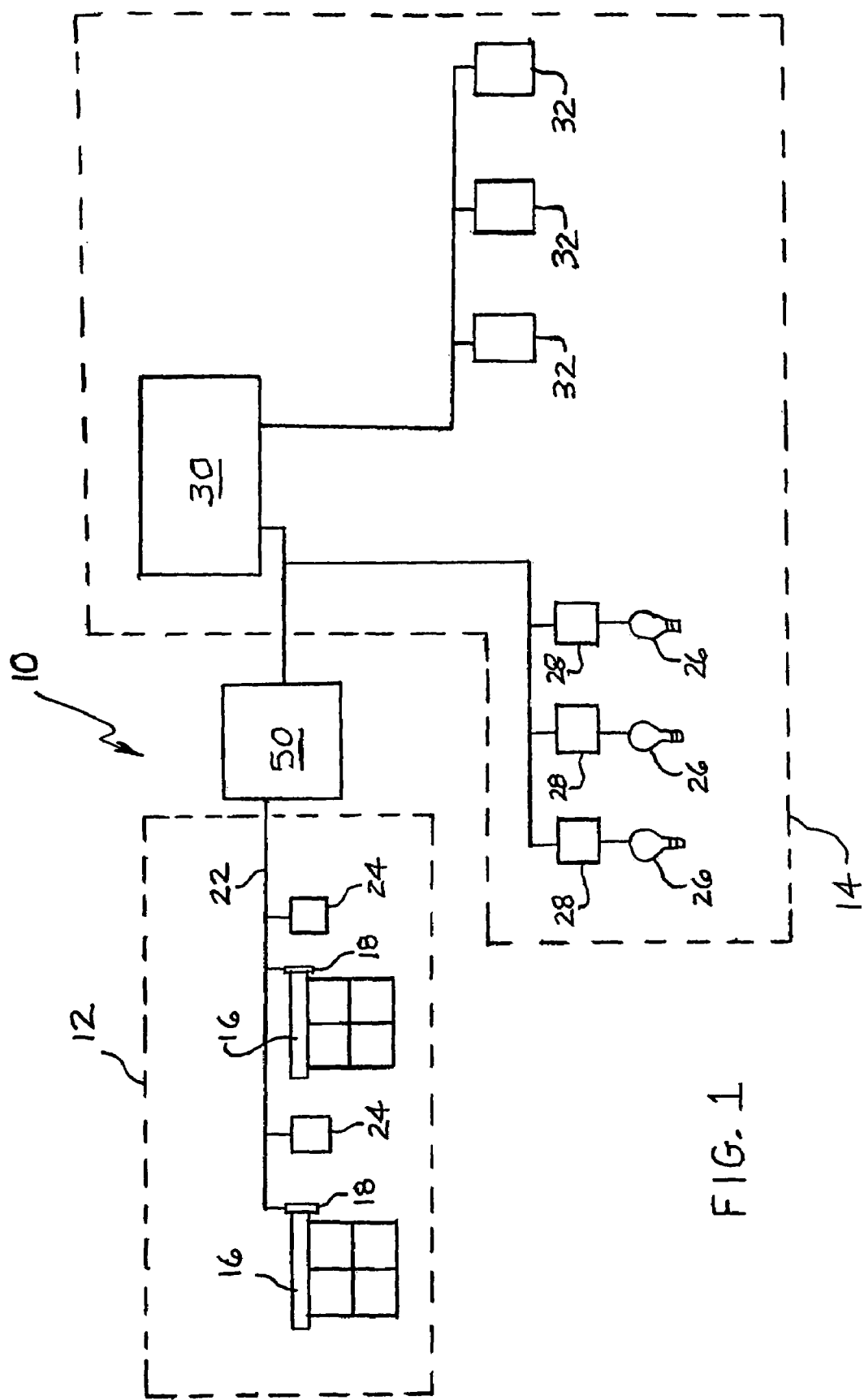
FIG. 1 is a schematic illustration of an integrated control system according to the present invention for controlling a shade network in addition to a lighting system.

Referring to the drawings, where like numerals identify like elements, there is shown schematically in FIG. 1 a control system 10 according to the present invention for controlling a shade network 12. As will be described in greater detail, the control system 10 is an integrated control system capable of controlling a lighting system 14 of a home or facility in addition to controlling the shade network 12.

The Shade Network

The shade network 12 of the integrated control system 10 of FIG. 1 includes multiple motorized shades 16 each including an electronic drive unit 18 (EDU) connected to a rotatably supported roller tube that windingly receives a flexible shade fabric. The shade network 12 may also include other devices such as shade keypad controllers 24 controlling the EDUs 18 of the motorized shades 16. The shade keypad controllers 24 control assigned motorized shades 16 by directing the EDUs 18 to raise or lower the associated shade fabric to a desired shade position or, alternatively, to move the shade fabric to a preset shade position stored in a memory. During initialization of the shade network 12, each shade keypad controller 24 is associated with one or more EDUs 18. This process is known as EDU assignment.

The EDUs 18 of the motorized shades 16, and the shade keypad controllers 24, of the shade network 12 are interconnected by cabling 22. The cabling 22 provides for transmission of signals between the shade keypad controllers 24 and the EDUs 18 for control of the motorized shades 16 and for communication of network-related information.

The components and devices of the shade network 12 are preferably interconnected such that each component or device can communicate with every other component or device on the network. A suitable shade network for use in the integrated control system of the present invention is shown and described in U.S. patent application Ser. No. 10/660,061, filed Sep. 11, 2003 and entitled "Motorized shade control system." As described in that application, a shade network arrangement that provides for communication to and from each component of the network facilitates addressing of the network components as well as other programming functions such as assignment of EDUs to keypad controllers.

Each of the EDUs 18 and shade keypad controllers 24 may have memory storage capability to provide for storage at the device of a database of information including network related information such as device addresses and EDU assignments, for example. It is not a requirement of the invention, however, that each device of the shade network 12 be adapted for memory storage. It is conceivable, for example, that the shade network 12 could include one or more centralized devices capable of memory storage for storage of network related information at those locations instead of at the EDUs 18 or shade keypad controllers 24 of the shade network 12. In addition to motorized shades 18 and shade keypad controllers 24, the shade network 12 could include other devices connected to the network such as contact closure interfaces (CCIs), for example.

The shade network 12 shown in FIG. 1 and described above includes roller shades. It should be understood, however, that the present invention is not limited to roller shades and is applicable to networks comprising other types of motorized shading treatments such as draperies and venetian blinds.

The term "fully-opened" as used herein should be understood as referring to a position for a motorized shading treatment that provides a minimum of light blockage for shading area, such as defined by a window for example, for which the shading treatment provides shading. The term "fully-closed" as used herein should be understood as referring to position for the motorized shading treatment that provides for maximum light blockage for the shading area by the shading treatment. In a similar manner, relative terms such as "half-opened" or "partially opened" should be understood in relation to the "fully-opened" or "fully-closed" positions for the shading treatment.

The Lighting System

The lighting system 14 of the integrated control system 10 includes dimmable loads 26, such as lamps. In a manner similar to the motorized shades 16 of the shade network 12, the dimmable loads 26 of the lighting system 14 are interconnected in a network arrangement that provides for receipt of required power by the dimmable loads 26 from the lighting system 14. The lighting system 14 may also include dimming controllers 28, each adapted for controlling one or more dimmable loads 26 of the lighting system 14. The use of the shade keypad controllers 24 in shade network 12 and dimming controllers 28 in lighting system 14 facilitates optional programming and operation of the motorized shades 16 and dimmable loads 26 independently from that provided by the integrated control system. It is not a requirement of the invention that the shade network 12 and lighting system 14 include controllers 24, 28, however, since integrated control of both systems form a centralized location is provided for by the integrated control system 10 as discussed below.

The Central Processor

The integrated control system 10 includes a central processor 30. As shown in FIG. 1, the central processor 30 is connected to the shade network 12 and the lighting system 14 and is adapted for integrated control of both the shade network 12 and the lighting system 14. The integrated control system 10 also includes keypad controllers 32 connected to the central processor 30 for controlling either the motorized shades 16 of the shade network 12 or the dimmable loads 26 of the lighting system 14 from a single convenient location, such as a wall-mounted location for example.

The central processor 30 functions to transmit control signals, input at one of the keypad controllers 32, for example, to the lighting system 14 and to direct the lighting system 14 to modify the current delivered to one of the dimmable loads 26. The current for the dimmable loads 26 is set by the lighting system 14 to a particular intensity level ranging between 0 and 100 percent in response to the command signal from the central processor 30. The intensity levels for the dimmable loads 26 of the lighting system 14 may be raised and lowered by a user to a desired level or, alternatively, may be set to a preset intensity level programmed into the integrated control system 10 for the dimmable load 26.

The Keypad Controller

Figure 2:
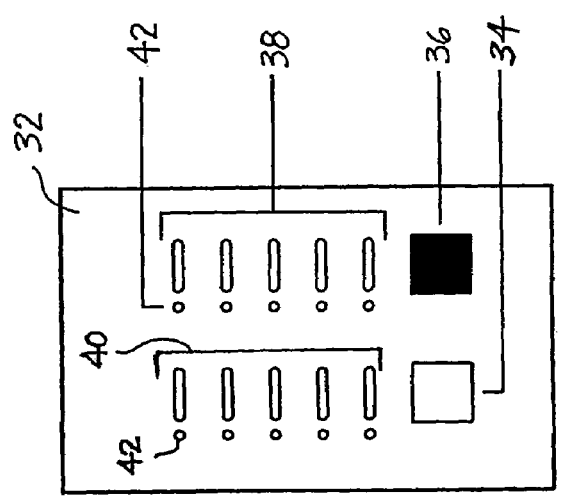
FIG. 2 is a front view of a keypad controller for an integrated control system according to the present invention.

Referring to FIG. 2, a suitable keypad controller 32 is shown. The keypad controller 32 preferably includes raise and lower actuators 34, 36 for respectively increasing or decreasing the intensity level for a dimmable load 26 of the lighting system 14 or raising or lowering the shade fabric of a motorized shade 16 on the shade network 12. The keypad controller 32 also includes a plurality of preset actuators 38, 40 for directing the integrated control system 10 to set a motorized shade 16 or dimmable load 26, respectively, assigned to the actuator to a preset intensity level (or equivalent shade position) that has been programmed into the integrated control system 10. The keypad controller 32 also includes an LED (Light Emitting Diode) 42 located next to each of the preset actuators 38, 40. The LEDs 42 provide a visual feedback, for indicating to a user whether a dimmable load 26 of the lighting system 14 is on or off, for example, or whether a motorized shade 16 of the shade network 12 is in a first or second preset position as described below in greater detail.

As described above, the shade control network 12 is adapted to direct the EDUs 18 of the motorized shades 16 to raise or lower the associated shade fabrics to a desired shade position or to move the shade to a preset shade position that has been programmed into memory storage. The central processor 30 of the integrated system 10, however, as described in the preceding paragraph, is adapted to direct signals representing intensity level, appropriate in a lighting system for controlling a dimmable load. To provide for control of the shade network 12 by the central processor 30, the command representing intensity level is converted into a shade position value more appropriate to a shade control system. The integrated system 10 is adapted to convert the intensity level values transmitted from the central processor 30, in response to user inputs at a keypad controller 32 for example, into shade position values such that an intensity level of 0 is equivalent to a shade in a fully-closed position and an intensity level of 100 percent is equivalent to a shade in a fully-opened position. In this manner, an existing lighting control system can be modified into an integrated control system capable of controlling shades and lights with only limited changes to the existing lighting system being required. An example of a lighting control system suited for modification in this manner is the HomeWorks® control system by Lutron Electronics Co., Inc. of Coopersburg, Pa.

The keypad controllers 32 of the integrated control system 10 are desirably wall-mountable for installation in a convenient location that facilitates access to the integrated control system 10 by a user. It should be understood, however, that the integrated control system 10 could also include hand held infrared transmitters (not shown) generating infrared signals for receipt by an infrared receiver connected to the system 10 within one of the keypad controllers 32 for example.

PC and GUI Software

Figure 3:
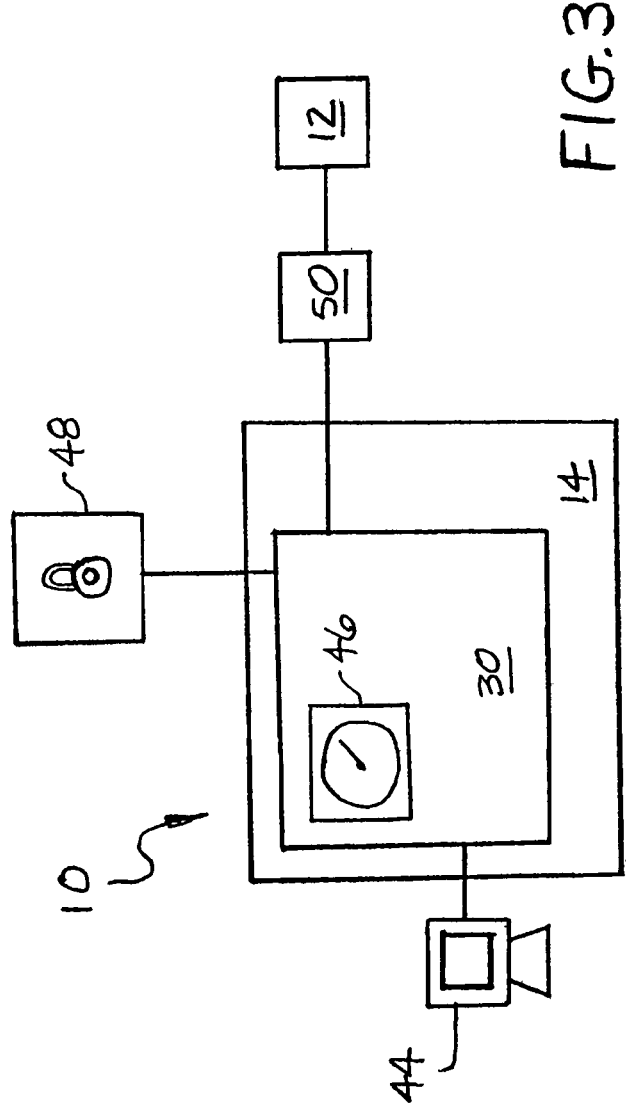
FIG. 3 is a schematic illustration of an integrated control system according to the present invention for controlling a shade network and a lighting system.

Referring to FIG. 3, the central processor 30 of the integrated control system 10 may be connected to a personal computer (PC) 44, through an RS-232 port at the central processor 30 for example. The connection of the PC 44 to the integrated control system 10 provides for programming and control efficiencies through the use of graphical user interface (GUI) software running on the PC 44. Such GUI software provides for screen displays and user selection prompts to facilitate system programming and other functions such as system diagnosis features for troubleshooting problems and installing new systems. Although the PC 44, and the GUI software loaded thereon, may also facilitate normal operation of the integrated control system 10 following installation or maintenance of the system, it is not required. It is conceivable for example, that the PC 44 could be connected to the central processor 30 using the RS-232 port of the processor solely for the purpose of programming the central processor 30 with the necessary information to provide for subsequent operation of the integrated system 10 via the keypad controllers 32. Following completion of the required programming of the central processor 30, therefore, the PC 44 could be disconnected from the central processor 30 for normal operation of the integrated system 10 without the PC 44.

In the integrated control system 10 shown in FIGS. 1 and 3, a programmable central processor 30 is included to provide for memory storage of system related information and for directing command signals relating to intensity levels to the lighting system 14 and to the shade network 12. As described above, a PC 44 could be used to operate the system 10. The PC 44 could be permanently included in the integrated control system 10 for use of the processor and memory storage capabilities of the PC 44 instead of including a separate central processor 30. The use of a separate programmable processor 30 as shown in FIGS. 1 and 3, however, provides for a more robust and durable construction for the integrated control system 10.

Timeclock and Vacation Mode

Referring again to FIG. 3, the integrated control system 10 may also include a timeclock 46 that is associated with the programmable central processor 30. Preferably, the timeclock 46 is embedded in the central processor 30. The association of the timeclock 46 with the central processor 30 provides for storage of time-based information in memory of the central processor 30 regarding the position or condition of the motorized shades 16 of the shade network 12 and the dimmable loads 26 of lighting system 14. For the shade network 12, for example, the central processor 30 could store information regarding shade position of a given motorized shade 16 at a given time of day. Such time-based information regarding the shade network 12 could then be used to create a macro program for directing the shade network 12 to automatically move the given motorized shade 16 to certain shade positions at different times of day based on the historical time-based information stored in memory by the integrated system 10. Once the macro program has been created, a user in a residential setting for example could activate the program, when leaving on a vacation, to provide for automatic control of the shade system 12 to mimic occupied use of the residence in accordance with the historical time-based information regarding the shade network 12 stored in memory by the central processor 30.

Shade Operation During Alert Mode

Still referring to FIG. 3, the central processor 30 of the integrated control system 10 may also be connected to a security system 48 for the home or facility in which the integrated control system 10 is installed. The integrated control system 10 could be programmed to set all of the dimmable loads 26 of the lighting system 14 to full intensity or to flash them rapidly, in response to an alert signal transmitted to the central processor 30 by the security system 48. The integrated system 10 could also be programmed to move all of the motorized shades 16 of the shade network 12 to a fully-opened position, thereby maximizing the effect produced in an alert mode by the dimmable loads 26 of the lighting system 14. The integrated control system 10 could alternatively be programmed to move the motorized shades 16 to their fully-opened positions and then to cycle between the fully-opened position and a partially closed position to provide an addition alert signal.

Communication Interface having a Buffer

Referring again to FIG. 1, the integrated control system 10 includes a communication interface device 50 connected between the central processor 30 and the shade network 12. The communication interface device 50 includes a buffer to store feedback information from the shade network 12 regarding the position or condition of the motorized shades 16 of the network 12. The storage of the feedback information from the shade network 12 by the buffer facilitates independent operation of the shade network 12 from the lighting system 14 for continued operation of either in the event of a failure of the central processor 30 for example.

The inclusion of the communication interface device 50 having a buffer also facilitates conversion of an existing lighting control system into an integrated system capable of controlling lights and shades. In a lighting control system, such as that provided by the above-mentioned HomeWorks® system, a streaming protocol communication system may be desired. In a communication system based on streaming protocol, packets of information are periodically transmitted between interconnected components. This form of communication is contrasted to an event-based protocol system of communication in which information is transmitted in response to an event, such as an input command via a keypad controller or feedback information following action by a component in response to a command (e.g., a motorized shade confirms movement in response to a command or indicates a failure condition).

A streaming protocol system provides for more flexibility in configuration of a control system. This is particularly desirable in control systems where relatively inexpensive devices are controlled, such as in lighting control systems for example, because network information can be transmitted from a centralized location without the need for memory storage at each device. The buffer of the interface communication device 50 provides for modification of an existing lighting control system that uses a streaming protocol communication, to add a shade control system adapted to communicate based on an event-based protocol, with limited changes to the lighting control system being required.

Methods of Controlling the Integrated Control System

1. Storage of Preset Intensity Levels at Central Processor

Figure 4:
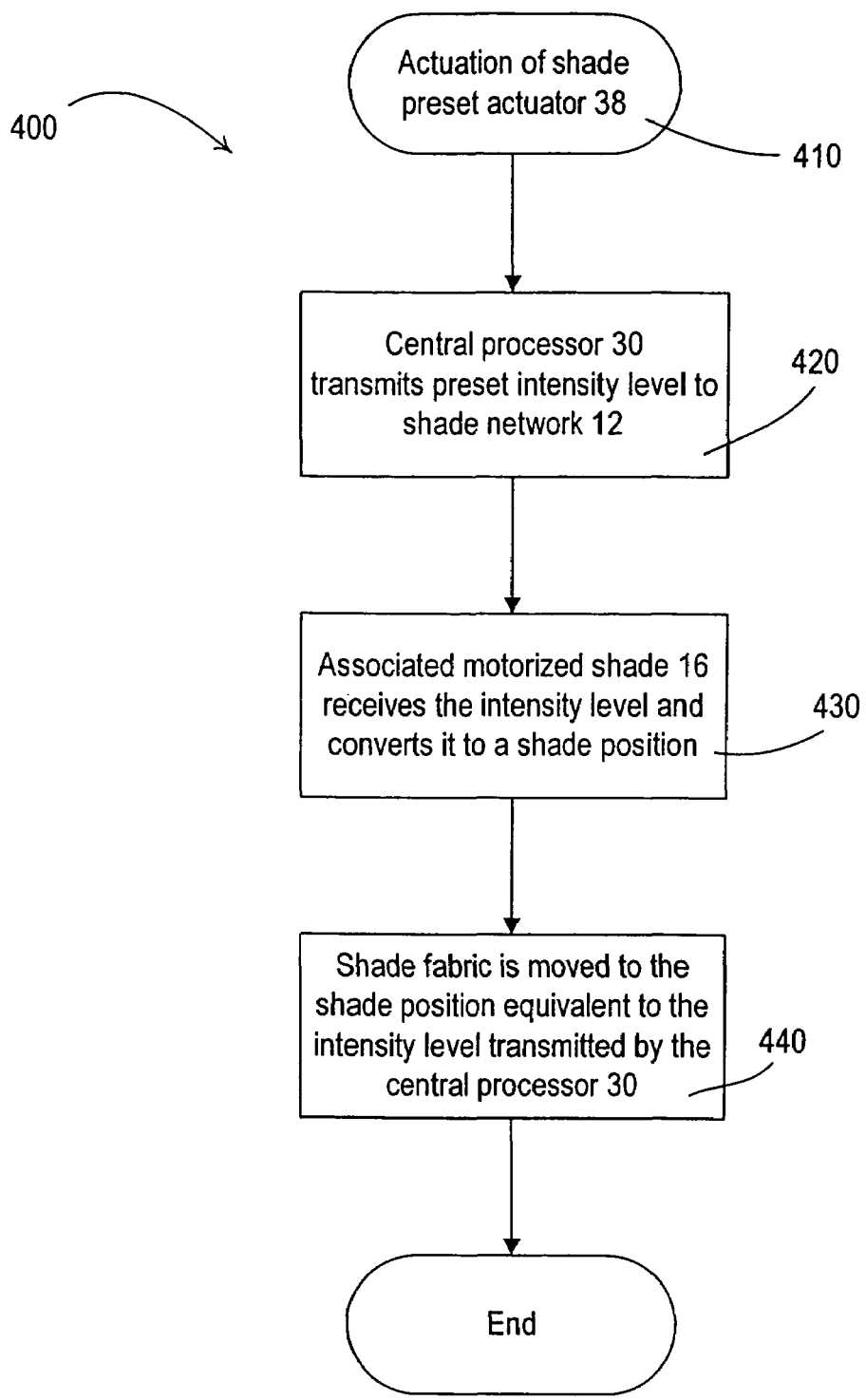
FIG. 4 is a flowchart illustrating a procedure for controlling a motorized shade by transmitting intensity levels from a central processor according to the invention.

A variety of methods may be used for control of the motorized shades 16 of a shade control network 12 by the integrated control system 10. As described above, the central processor 30 is preferably programmable for memory storage of preset intensity levels for the motorized shades 16 of the shade network 12. According to one method of control, the central processor 30 could be programmed to store in memory at the central processor the preset intensity levels for the dimmable loads 26 of the lighting system 14 and for the motorized shades 16 of the shade network 12. FIG. 4 is a flowchart of a procedure 400 for control of a motorized shade 16 by transmitting intensity levels from the central processor 30 to the shade network 12. In response to actuation of a shade preset actuator 38 of a keypad controller 32 (at step 410), the central processor 30 transmits the preset intensity level to the shade network 12 (at step 420). The intensity level is received by the associated motorized shade 16 and converted to a shade position (at step 430). The motorized shade 16 then directs its EDU 18 to move the shade fabric to the shade position equivalent to the intensity level transmitted by the central processor 30 (at step 440).

2. Storage of Preset Intensity Levels by the Shade Network

Figure 5:
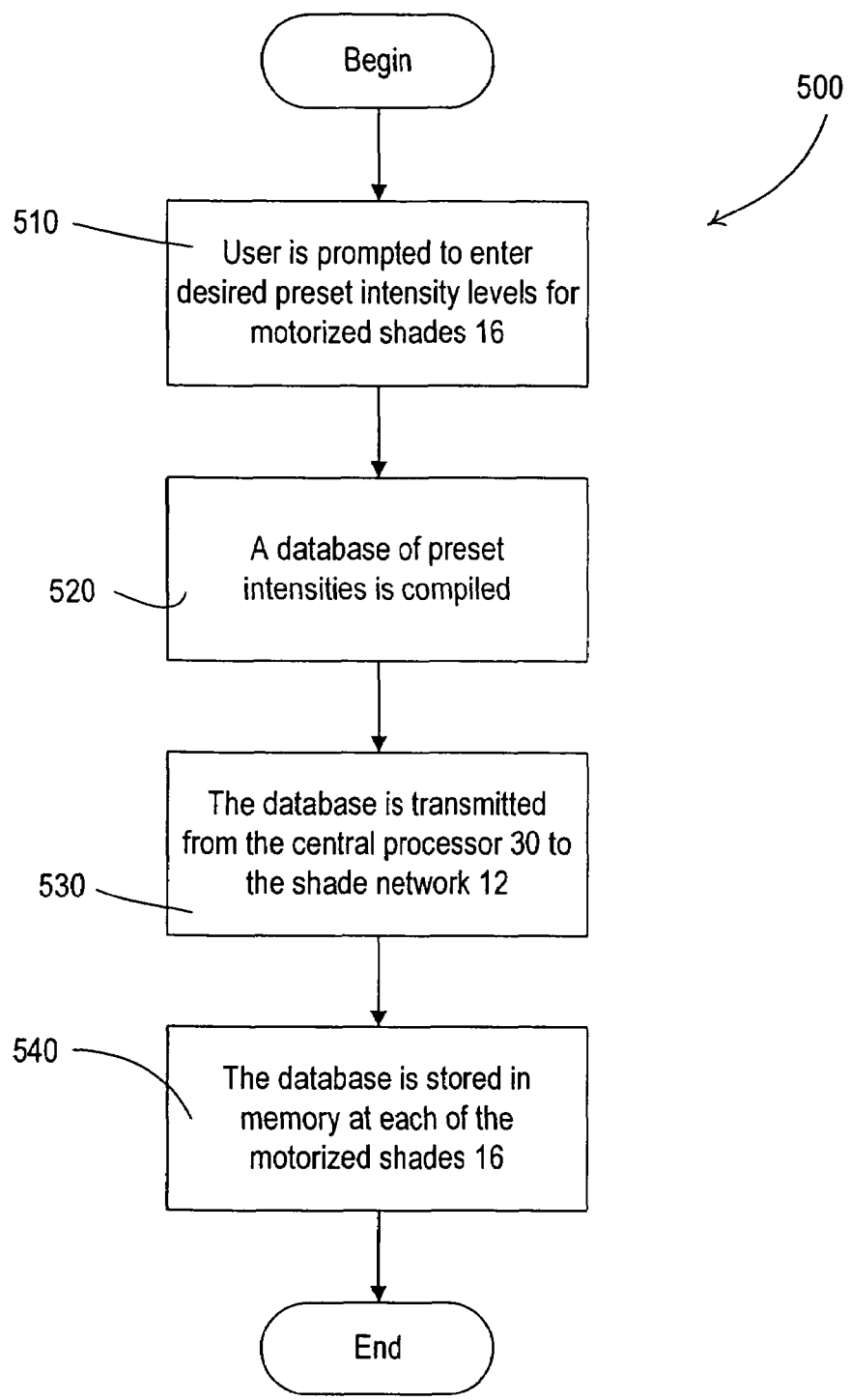
FIG. 5 is a flowchart illustrating a procedure for storing preset intensity levels for a motorized shade according to the invention.

Alternatively, the preset information could first be transmitted to the shade network 12, as part of programming of the integrated control system 10. As described above, the shade system 12 could be adapted to provide for memory storage capability at each motorized shade 16. FIG. 5 is a flowchart of a procedure 500 for storage of preset intensity levels by the shade network 12. Using the PC 44 having GUI software, a user could be prompted to enter desired preset intensity levels for the motorized shades 16 of the shade network 12 (at step 510). A database of preset intensities is then compiled by the GUI software of PC 44 (at step 520) and transmitted by the central processor 30 to the shade network 12 (at step 530) for storage in memory at each of the motorized shades 16 of the system 12 (at step 540).

Figure 6:
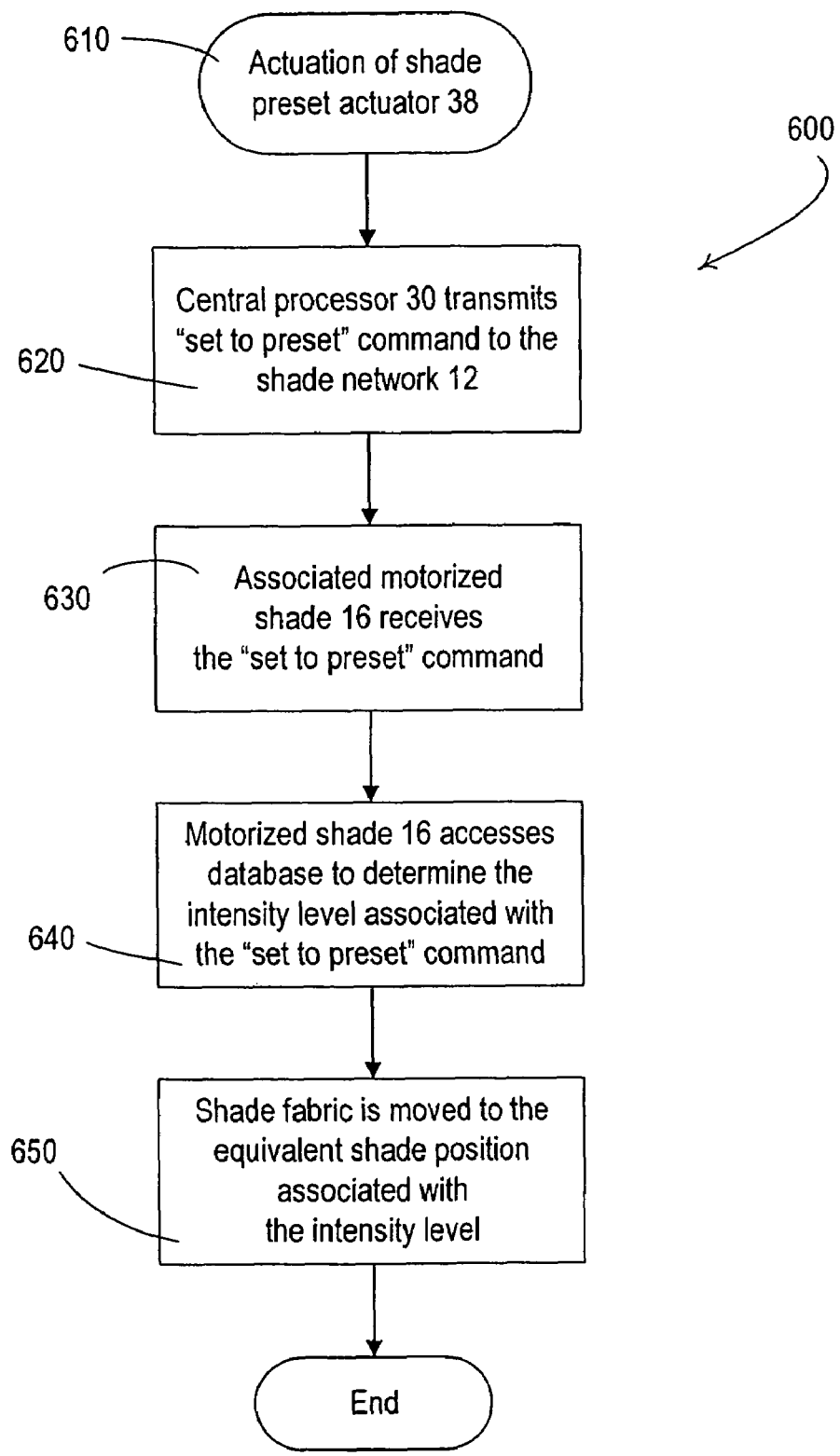
FIG. 6 is a flowchart illustrating a procedure for controlling a motorized shade by transmitting a "set to preset" command from a central processor according to the invention.

FIG. 6 is a flowchart of a procedure 600 for control of a motorized shade 16 by transmitting a "set to preset" command from the central processor 30 to the shade network 12. According to this alternative method of control, subsequent actuation of a preset actuator 38 of a keypad controller 32 (at step 610) causes the central processor to transmit a "set to preset" command (at step 620). This differs from the above method (in FIG. 4) in which a signal representing the actual intensity level was transmitted to the shade network 12 by the central processor 30 based on database information stored in memory at the central processor 30. According to the present alternative control method, the "set to preset" command is transferred to the motorized shade 16 (at step 630) which accesses the database of information stored at the motorized shade to determine the intensity level associated with the "set to preset" command (at step 640). The motorized shade 16 then converts the intensity level to an equivalent shade position and directs its EDU 18 to move the shade fabric to the equivalent shade position (at step 650). Transmitting a "set to preset" command provides for reduction in the total communication time because the same "set to preset" command may be sent to the motorized shades rather than sending multiple signals to each motorized shade including the intensity level associated with the preset.

Although memory storage at each of the motorized shades 16 of the shade system 12 is preferred in the alternative control method described in the previous paragraph, it is not required. It is within the scope of the invention, for example, that the database of information that is compiled by the GUI software and delivered to the shade network 12 by the central processor 30 (at step 530 of FIG. 5) could, instead, be stored in one or more storage devices centrally located with respect to the shade network 12.

3. Toggle Functionality for Setting Shades to Preset Intensity Levels

The shade preset actuators 38 of the keypad controllers 32 could be used to control the motorized shades 16 of the shade network 12 using a toggling functionality as follows. It is known for lighting control systems, for example, to use toggling functionality to switch a dimmable lighting load between first and second intensity levels by actuation of a preset button. A processor associates the first and second intensity levels for the dimmable lighting loads with first and second states toggled by the preset button. Actuation of the preset button toggles the states between the first and second states. The processor sets the dimmable lighting load to one of the first and second intensity levels depending on the state for the preset button.

Figure 7:
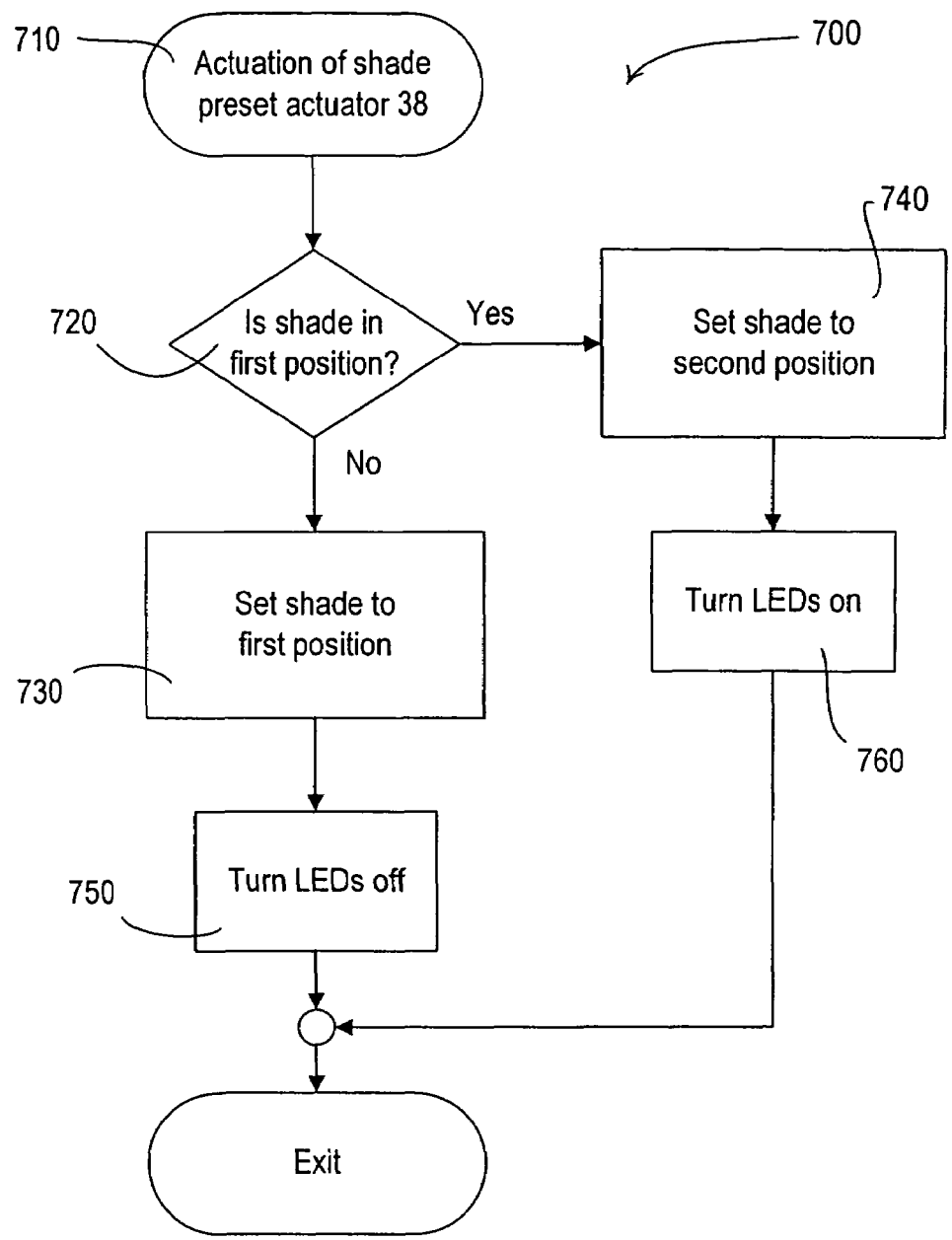
FIG. 7 is a flowchart illustrating a procedure for toggling the position of a motorized shade between two preset positions according to the invention.

In lighting systems the first preset intensity level is typically set by default to zero and the second preset intensity level to a desired non-zero intensity. The states associated with the first and second preset intensity levels are, therefore, referred to as the "off" and "on" states. FIG. 7 is a flowchart of a procedure 700 for toggling the position of a motorized shade between two preset positions in response to an actuation of a shade preset actuator 38 (at step 710). In the integrated control system 10, the central processor 30 could be programmed to toggle a motorized shade 16 of a shade network 12 between first and second preset shade positions (at steps 730 and 740, respectively) depending on first and second states (at step 720) toggled by one of the shade preset actuators 38 of a keypad controller 32, for example. For the first, or "off" state, the central processor 30 could be programmed to set the associated shade position to a fully-opened shade position by default, or alternatively to a fully-closed shade position. The central processor 30 would then toggle the motorized shade 16 between the first shade position (i.e., the default "off" shade position) and a second preset position stored in memory for the motorized shade 16 in response to actuation of the shade preset actuator 38. The ability to toggle between two preset positions may be desirable for a variety of reasons including, for example, privacy concerns, lighting factors, or facilitating view from a window.

The LEDs 42 adjacent the preset actuators 38 of the keypad controllers 32 provide for visual indication to a user regarding which of the first and second preset positions to which the associated motorized shade 16 is set. The integrated control system 10 could be arranged, for example, to turn the LEDs "on" and "off" (at steps 750 and 760), respectively, when the associated preset shade actuator 38 is in the "on" and "off" states.

4. Stepped Shade Movement to Simulate Reduced Motor Speed

The EDUs 18 for the motorized shades 16 of a shade network 12 are typically adapted to drive the associated roller tubes at one set rate of speed. The integrated control system 10, however, can be adapted to direct a motorized shade 16 to move a shade fabric in a stepped manner that simulates a relatively slowly, but continuously, moving shade. This may be accomplished by central processor 30 transmitting, in periodic fashion, a sequence of intensity levels that increase or decrease in a substantially equal step with each intensity level that is transmitted. If the duration of each step, as well as the duration of intervening period between steps, is sufficiently short, the resulting movement of the shade will appear to be continuous but slower than that provided by a shade being normally driven by an EDU 18 between two shade positions. Including a PC 44 running GUI software greatly simplifies programming of the central processor 30 to direct stepped movement of motorized shades 16.

5. Reduced Motor Speed by Voltage Control

Instead of simulating a reduced motor speed using stepped movement at normal speed, the motor speed for the motorized shade 16 of a shade network 12 could be reduced by variation in the voltage applied to the motor of the motorized shade 16. In response to a motor speed command from the central processor 30, a microprocessor in the EDU 18 for the motorized shade 16 would apply appropriate voltage associated with the motor speed command by varying the duty cycle of a pulse width modulated drive signal applied to the motor. Control of motor speed for a motorized window shade in this manner is described in greater detail in U.S. Pat. Nos. 6,100,659 and 6,497,267. Motor speed for the motorized shades 16 of a shade network 12 could also be controlled based on other characteristics such as frequency of a driving signal, for example.

6. Integrated System Operating Multiple Shade Networks

The integrated control system 10 of FIG. 1 is shown with a single shade network 12 being connected to the central processor along with a single lighting system 14. It should be understood, however, that the integrated system 10 could include multiple shade networks 12 and multiple lighting systems 14 connected to the central processor 30 for integrated control by the system 10. The inclusion of multiple shade networks 12 in the integrated control system 10 would provide for independent operation of each of the shade networks 12 and lighting systems 14 from the other networks 12 and systems 14. The provision for connection of multiple shade networks 12 to the central processor 30 would also desirably provide for increase in the total number of shades that may controlled together by the integrated control system 10 in the event that a desired number of motorized shades 16 exceeds that which may be connected to a single shade network 12, either based on the number of shades or some other limitation of the network 12 such as maximum wire length, for example.

Methods of Programming the Integrated Control System

1. Visually Identifying Shade by "Wiggle" Method

Figure 8:
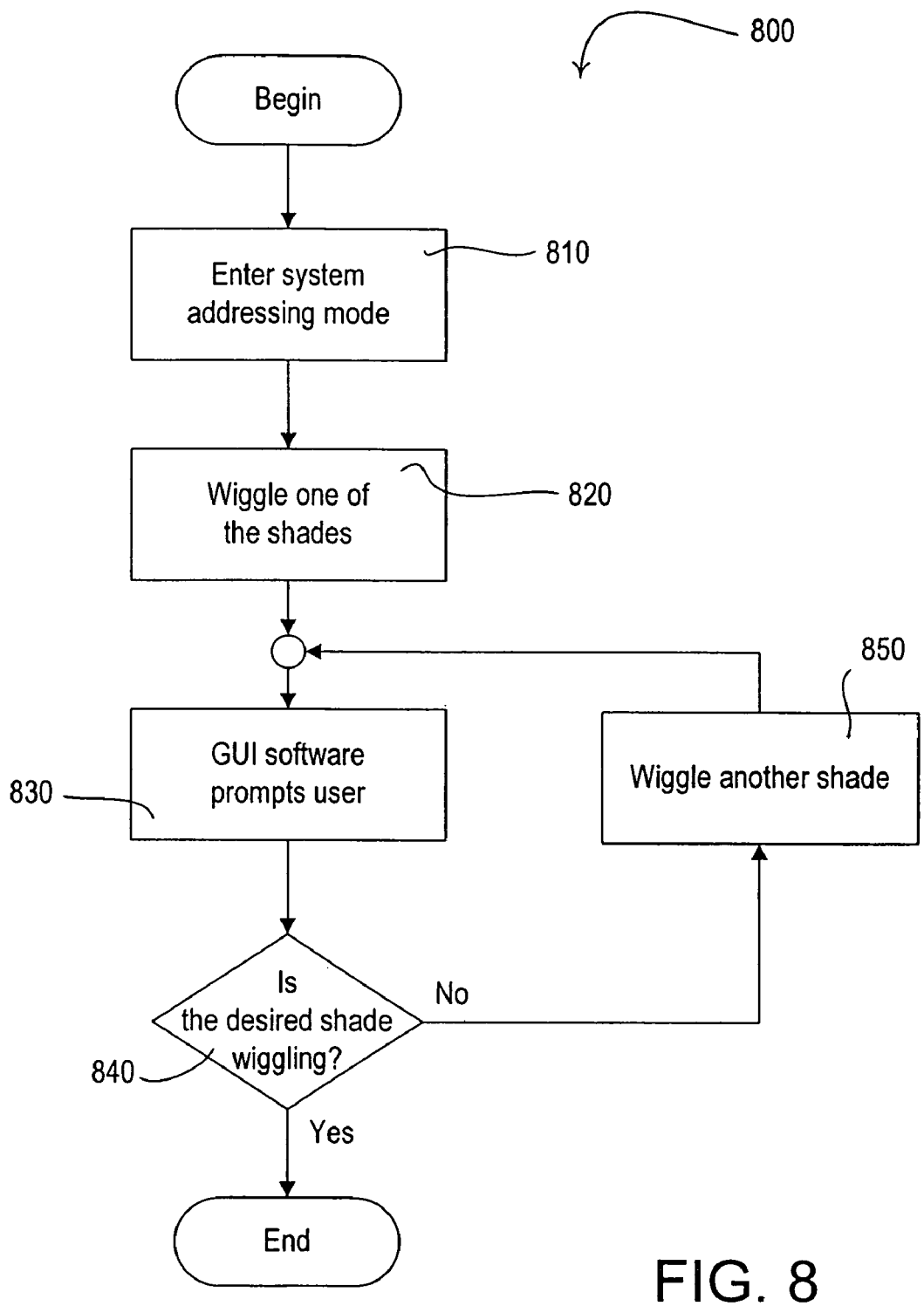
FIG. 8 is a flowchart illustrating a procedure for visually identifying a particular shade according to the invention.

The integrated control system 10 is programmed to address the motorized shades 16 of a shade network 12 to the system 10 such that a unique identifier is associated by the system 10 with each motorized shade 16 of the shade network 12. The above-described PC 44 having GUI interface can be used to facilitate addressing of the motorized shades 16 of a shade network 12 to the integrated control system 10 in accordance with the following methods. FIG. 8 is a flowchart of a procedure 800 for visually identifying a particular shade by the "wiggle" method. According to this method, a user would enter a shade system addressing mode (at step 810) in the GUI software by actuation of a keystroke at the PC 44 or through a GUI selection prompted by the system 10. The central processor 30 would then direct the shade network 12 to raise and lower the shade fabric of one of the motorized shades 16 over a short distance (i.e., to "wiggle" the shade fabric at step 820). The wiggling of the shade fabric provides a visual means of identifying a particular motorized shade within the shade system 12. The user is then prompted by the GUI software to indicate whether the wiggling shade is the particular shade to be addressed by selecting "yes" or "no" (at step 830). If "no" is selected by the user (at step 840), the central processor 30 directs the shade network 12 to "wiggle" the shade fabric of another motorized shade 16 of the network 12 (at step 850) and again prompt the user to select "yes" or "no" (at step 830). This procedure is repeated until the shade fabric of the desired motorized shade 16 is wiggled by the shade network 12 and "yes" is selected by the user (at step 840).

2. Visually Identifying Shades using Subset Reduction

According to an alternative method of visually identifying a particular motorized shade 16 of a shade network 12 in a shade addressing programming mode, a subset of motorized shades 16 initially includes all of the motorized shades 16 of the shade network 12. The central processor 30 directs the shade network 12 to move one half of the motorized shades 16 of the current subset to a fully-opened position and the other half of the subset to a fully-closed position. The user is then prompted by the GUI software to select "opened" or "closed" to identify the position of the desired motorized shade 16. The process is then repeated with the selected subset half becoming a new subset of motorized shades 16 and the processor directing the shade network 12 to move half of the shades of the new subset to fully-opened and half to fully-closed. This procedure is repeated until the desired motorized shade 16 is the only motorized shade in the subset.

The method of the previous paragraph, in which half of the shades of the subset are moved to fully-opened and half are moved to fully-closed provides a binary system of visually identifying a particular motorized shade 16 of the shade network 12. A binary system, however, is not required. The system 10 could be adapted, for example, to direct the shade network to move 1/N of the shades of the current subset to one of N shade positions. For example, the shades in a current subset of shades could be divided into quarters that are respectively moved to fully-opened, fully-closed, one-quarter raised and three-quarter raised positions.

3. Manual Input of Shade Serial Numbers

Figure 9:
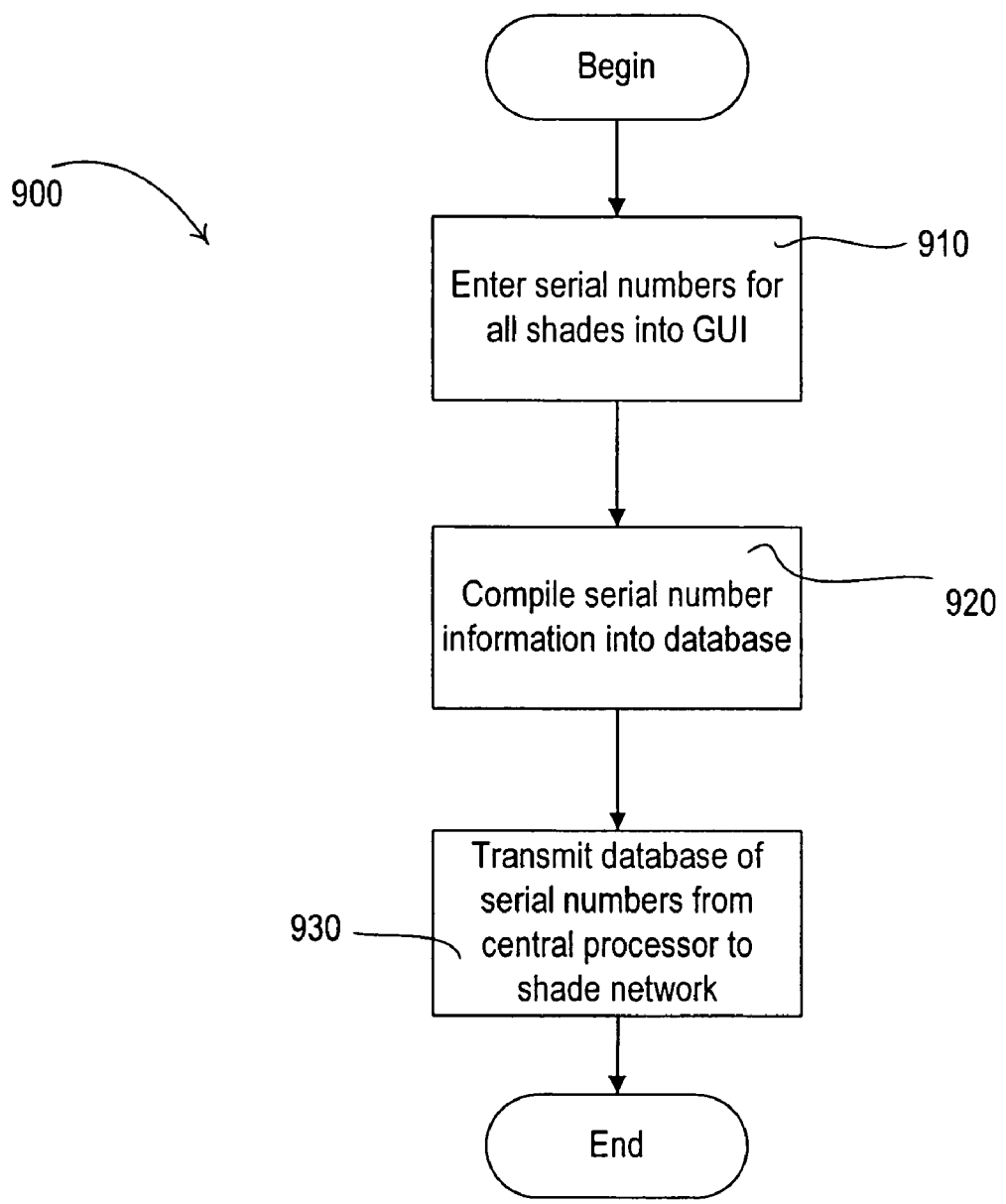
FIG. 9 is a flowchart illustrating a procedure for manually inputting serial numbers for motorized shades according to the invention.

The above methods of uniquely identifying motorized shades 16 of the shade network 12 in a shade addressing programming mode are based on visual identification of a particular motorized shade 16. Alternatively, the motorized shades 16 of a shade network 12 could also be addressed to the integrated control system 10 based on the serial numbers for the motorized shades 16, which are unique to each motorized shade 16. FIG. 9 is a flowchart of a procedure 900 for manual input of serial numbers of the motorized shades 16. A user would be prompted by the GUI software to enter the serial number for each of the motorized shade 16 of a shade network 12 (at step 910). After all of the serial numbers have been input into the computer 44, the GUI software then compiles the information to form a database of shade serial numbers (at step 920). This database of information is then transmitted by the central processor 30 to the shade network 12 (at step 930).

4. Input of Shade Serial Number File from External Storage

Alternatively to the method described in the previous paragraph, the serial numbers for each of the motorized shades 16 of a shade network 12 could be first stored in a file in a memory external to the PC 44 of the integrated control system 10. The file containing the shade serial numbers is then transferred to the PC 44 of the integrated control system 10, via e-mail transmission or by diskette, for example, and is imported into the GUI software by the computer 44. The GUI software then compiles the file information to form a database of shade serial numbers that is transmitted to the shade network 12 by the central processor 30.

The foregoing describes the invention in terms of embodiments foreseen by the inventors for which an enabling description was available, notwithstanding that insubstantial modifications of the invention, not presently foreseen, may nonetheless represent equivalents thereto.

What is claimed is:

1. A control system comprising:
at least one shade control network including at least one motorized shade;
a central processor for controlling the at least one shade control network, the central processor adapted to transmit control signals and database information to the motorized shades of each shade control network and to receive feedback information therefrom; and
a communication interface device for each shade control network, each of the communication interface devices connected between the central processor and a shade control network to facilitate transmission of signals and database information therebetween,
the communication interface device including an information buffer for holding the feedback information from the associated shade control network for independent retrieval by the central processor.

2. The control system according to claim 1, wherein the central processor is further adapted to control at least one control network that does not include a motorized shade.

3. The control system according to claim 2, wherein the central processor is adapted to control a lighting control network in addition to the at least one shade control network.

4. The control system according to claim 2, wherein communication between each of the communication interface devices and the central processor is based on a streaming protocol and communication between the interface device and the associated shade control network is based on an event-based protocol.

5. The control system according to claim 4 comprising a plurality of shade control networks each connected to a communication interface device.

6. A method for controlling lights and shades comprising the steps of:
providing a central processor adapted to transmit control signals for setting a device connected to the central processor to a desired intensity level;
connecting the central processor to a lighting system including at least one dimmable load;
transmitting control signals from the central processor to the lighting control system to direct the lighting control system to set the dimmable loads of the lighting system to desired intensity levels;
connecting the central processor to a shade control system including at least one motorized shade; and
transmitting control signals from the central processor to the shade control system to direct the shade control system to set the at least one motorized shade of the shade control system to a desired intensity level, the shade control system adapted to convert the intensity level transmitted by the central processor into a shade position for the at least one motorized shade of the shade control system.

7. The method according to claim 6 further comprising the steps of:
transmitting a sequence of control signals from the central processor to the shade control system such that the shade control system moves a motorized shade of the shade control system in a series of substantially evenly timed steps of substantially equal distance to simulate a relatively slowly moving shade compared to a normal rate of driven movement for the motorized shade.

8. The method according to claim 6, wherein a motor speed for the at least one motorized shade of the shade control system is variable and wherein the method further comprises the step of:
transmitting a signal concurrently with the intensity level directing the at least one motorized shade to move to the associated shade position at a desired speed.

9. A method for controlling lights and shades comprising the steps of:
providing a programmable central processor adapted to store preset intensity levels in a database of information for devices connected to the central processor;
connecting the central processor to a lighting control system including at least one dimmable load;
connecting the central processor to a shade control system including at least one motorized shade;
programming the central processor to store preset intensity levels for the dimmable loads of the lighting control system in the database of information;
programming the central processor to store a preset intensity level for the at least one motorized shade of the shade control system in the database of information; and
transmitting a portion of the database of information that includes the preset intensity level for the at least one motorized shade of the shade control system from the central processor to the shade control system, the shade control system adapted to convert the preset intensity levels into preset shade positions.

10. The method according to claim 9 further comprising the steps of:
connecting a user interface to the central processor, the user interface adapted to transmit a command signal to the central processor regarding a selected preset intensity level for the at least one motorized shade of the shade control system in response to a user input; and
transmitting the command signal regarding the selected intensity level from the central processor to the shade control system, the shade control system directing the at least one motorized shade to move to the preset shade position associated with the selected intensity level.

11. The method according to claim 9, wherein a motor speed for the at least one motorized shade of the shade control system is variable and wherein the method further comprises the steps of:
programming the central processor to store a desired motor speed associated with the preset intensity level for the at least one motorized shade of the shade control system in the database of information for directing the motorized shade to move to the associated preset shade position at the desired motor speed; and
transmitting the motor speed with the associated preset intensity level to the shade control system in the portion of the database of information that includes the preset intensity level for the at least one motorized shade of the shade control system.

12. A method for controlling at least one motorized shade, the method comprising the steps of:
providing a shade control network including at least one motorized shade, each motorized shade adapted to transmit feedback information regarding shade position or other condition associated with the shade to the shade control network;
providing a central processor connected to the shade control network for controlling the motorized shades of the shade control network, the central processor adapted to receive the feedback information from the shade control network regarding the condition or position of the motorized shades;
providing a communication buffer connected to the central processor and the shade control network, the communication buffer adapted to store feedback information from the shade control network in memory for independent transmission to the central processor;
transmitting feedback information from the motorized shades of the shade control system to the communication buffer; and
storing the feedback information for the motorized shades in memory at the communication buffer.

13. The method according to claim 12 further including the steps of:
providing a timing device for associating the shade position for the motorized shades to the time of day;
transmitting shade position information from the motorized shades to the communication buffer;
retrieving the time of day from the timing device;
storing the shade position information for the motorized shades and the associated time information in memory at the communication buffer;
transmitting the shade position information for the motorized shades and the associated time information from the communication buffer to the central processor;
creating a time-based macro program for directing the motorized shades of the shade control network to move to given positions at certain times of day based on the information transmitted to the central processor from the communication buffer; and
executing the time-based macro program.

14. The method according to claim 12 further including the steps of:
   providing a link between the central processor and the communication buffer adapted for transmitting information in cycled packets of information based on a streaming protocol; and
   transmitting feedback information regarding the motorized shades of the shade control network from the communication buffer to the central processor in a sequential manner using the streaming protocol such that any packet of information transmitted to the central processor that includes feedback information includes feedback information associated with only one of the motorized shades.

15. A method for controlling a shade system including at least one motorized shade, the method comprising the steps of:
   providing a programmable processor having memory storage capability;
   providing a controller having an actuator connected to the programmable processor;
   connecting the programmable processor to a motorized shade including a rotatably supported roller tube and a flexible shade fabric windingly received by the roller tube;
   programming the programmable processor to store in memory a first preset value associated with a first shade position and a second preset value associated with a second shade position;
   moving the motorized shade to the first preset shade position in response to an actuation of the actuator; and
   moving the motorized shade to the second preset shade position in response to a subsequent actuation of the actuator.

16. The method according to claim 15, wherein the programmable processor is connected to a controller having an actuator and wherein motorized shade is toggled between the first and second shade positions in response to actuation of the actuator.

17. The method according to claim 15, wherein the controller includes an LED located adjacent the actuator to provide visual indication of the shade position to which the motorized shade is toggled to.

18. The method according to claim 17, wherein the programmable processor is programmed to set the first shade position by default to either a fully-opened shade position or a fully-closed shade position.

19. A method for programming a shade control system including at least one motorized shade, the shade control system including a communication network connected to each motorized shade, the method comprising the steps of:
   connecting a computer having user interface capability to the communication network of the shade control system;
   transmitting at least a portion of a database of information regarding the shade control shade control system from the computer to the shade control system; and
   storing the portion of the database of information received by the shade control system in a memory in the shade control system.

20. The programming method according to claim 19, wherein each of the motorized shades of the shade control system has memory storage capability, the method further comprising the steps of:
   connecting a programmable processor between the computer and the shade control system;
   transmitting the entire database of information regarding the shade control system from the computer to the programmable processor;
   transmitting at least a portion of the database of information from the programmable processor to each of the motorized shades;
   storing the portion of the database of information in memory at each of the motorized shades of the shade control system;
   transmitting an acknowledgement of receipt of the database portion from each of the motorized shades to the programmable processor; and
   transmitting a report from the microprocessor to the computer regarding acknowledgement by the at least one motorized shade.

21. The programming method according to claim 20, further comprising the steps of:
   connecting a communication interface to the communication network of the shade control system to facilitate transfer of information with the shade control system; and
   connecting the programmable microprocessor to the communication interface.

22. The programming method according to claim 21, wherein the processor is part of an integrated control system, the processor capable of controlling at least one other control system including a lighting control system in addition to the shade control system.

23. The programming method according to claim 21, further comprising the steps of:
   connecting a plurality of communication interfaces to a plurality of shade control systems, each shade control system including at least one motorized shade and a communication network connected to each of the motorized shades; and
   connecting the programmable processor to each of the communication interfaces.

24. The programming method according to claim 19, further comprising the step of:
   directing the shade control system to move the motorized shades in a sequential manner in response to a series of user inputs to provide for unique identification of the motorized shades by the shade control system.

25. The programming method according to claim 19, further comprising the steps of:
   inputting a serial number for each of the motorized shades of the shade control system into the computer;
   storing the serial number for each of the motorized shades in the database of information; and
   transmitting the database of information to each motorized shade.

26. The programming method according to claim 19, further comprising the steps of:
   storing a serial number for each of the motorized shades of the shade control system in a memory external to the computer;
   importing the serial numbers for the motorized shades of the shade control network from the external memory into the database of information in the computer; and
   transmitting the database of information to each motorized shade from the computer.

27. The programming method according to claim 19, further comprising the steps of:
   directing the shade control system to move the motorized shades of the shade control system to provide for visual identification of a particular shade among a reduced number of shades in a first subset of shades;

further reducing the number of shades in subsequent subsets by repeating the step of directing the shade control system to move the motorized shades with respect to subsequent subsets until a subset is formed that includes only the particular motorized shade to provide for unique identification of the particular motorized shade by the shade control system.

28. The programming method according to claim 27, wherein half of the shades of a given subset are moved to form the next subset of shades including the particular shade.

29. The programming method according to claim 19, wherein the shade control system further includes at least one controller connected to the communication network, the controller having memory storage capability for storage of database information regarding the shade control system, the method further comprising the steps of:

transmitting at least a portion of the database of information to each of the controllers of the shade control system; and storing the portion of the database of information in memory at each of the controllers of the shade control system.

* * * * *